Feb. 11, 1936.    G. CAWLEY    2,030,571
VALVE OPERATING MECHANISM
Filed Oct. 20, 1931    2 Sheets-Sheet 1

INVENTOR
George Cawley
BY
Gifford, Scull & Burgess
ATTORNEYS.

Feb. 11, 1936.   G. CAWLEY   2,030,571
VALVE OPERATING MECHANISM
Filed Oct. 20, 1931   2 Sheets-Sheet 2

INVENTOR
George Cawley
BY
Gifford, Scull & Burgess
ATTORNEYS.

Patented Feb. 11, 1936

2,030,571

UNITED STATES PATENT OFFICE 2,030,571

VALVE OPERATING MECHANISM

George Cawley, Upper Montclair, N. J.

Application October 20, 1931, Serial No. 569,886

8 Claims. (Cl. 121—163)

This invention relates to a novel and improved valve operating mechanism, the novel features of which will be best understood from the following description and the annexed drawings, in which I have shown selected embodiments of the invention, and in which.

Figure 1:
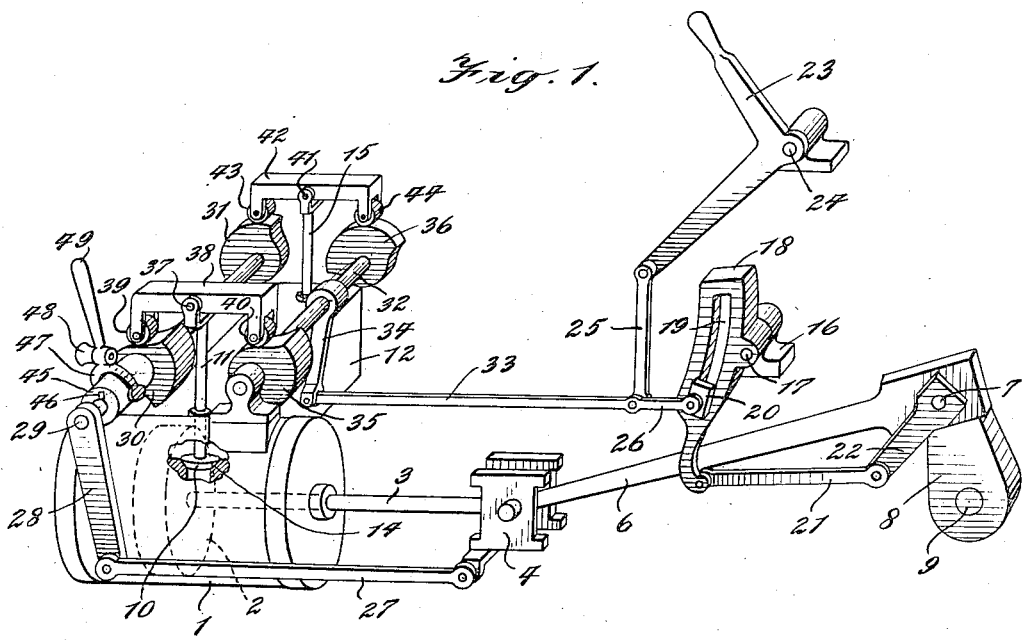
Fig. 1 is a perspective view of one form of the invention.

Figs. 3, 4, 5, and 6, are diagrams illustrating the operation of the invention with a slightly different embodiment.

My invention relates to means for accurately operating valves, particularly of the poppet type, which move to and from a seat, especially when such valves are used in situations where they should operate in synchronism with a plurality of different moving parts of a mechanism. For the sake of illustration, I have shown the invention as applied to a reciprocating steam engine, such as used in locomotives, although it is to be understood that the invention may be employed with other mechanisms when found applicable.

Referring to the drawings, the numeral 1 designates a cylinder of a reciprocating steam engine which, for the sake of illustration, has been selected as an engine with which the invention is used. Within the cylinder reciprocates a piston 2 having a stem 3 extending through the head of the cylinder, and connected to a cross-head 4 sliding on suitable guides 5. Connected to the cross-head is the connecting rod 6 which, in turn, is connected by the pin 7 to the crank 8 secured to the driving shaft 9.

Reciprocation of the piston is caused by steam or other fluid which is caused to enter the cylinder and to be exhausted therefrom. The inlet and exhaust are controlled by valves as well known in the art, and it is with the operating mechanism for these valves that my invention finds particular utility. For the sake of simplicity, I have indicated the valve as being of the single disk type, although it is to be understood that the invention may be used with any form of valve, so long as it is of the type generally known as a "poppet valve"; that is to say, one which moves to and from a positive seat or seats.

As noted above, the usual valves are employed with the cylinder and piston, and in Fig. 1, I have shown the invention as applied to the operation of the inlet and exhaust valves at the crank end of the cylinder, whereas in Figs. 3, 4, 5, and 6 I have indicated how the invention could be applied to the operation of one of the valves, namely, the inlet valve at the head end of the cylinder, that is to say, the end opposite the crank end. For the sake of simplicity, I have not shown in Fig. 1 the means for operating the valves at the other or head end of the cylinder, since the addition of such means to the arrangement shown in Fig. 1 will be obvious to those skilled in the art. Since in Figs. 3, 4, 5, and 6 I have shown an inlet valve, I shall refer to that valve by the same number as the inlet valve of Fig. 1, and shall identify the cams and other operating parts therefor by the same numbers.

The inlet valve is designated 10, and its stem 11 has a sliding fit in an opening in the casing 12. Steam may pass through the steam-chest 13 into the cylinder, between the valve 10 and its seat 14, the valve being guided by its stem in a rectilinear movement to and from its seat. The outlet valve likewise connects the steam-chests with the cylinder, although the valve itself and its seat are not illustrated, the stem 15 thereof, however, appearing in Fig. 1. For the purpose of understanding my invention, further illustration of the outlet valve is not needed, it being understood that its construction and operation are similar to that of the inlet valve.

The numeral 16 designates any fixed part of the engine supporting a pivot 17 upon which is rockably mounted a link 18 having a curved slot 19 therein in which slides a block 20. The link is rocked by the links 21 and 22 which connect it to the crank pin 7 and is used to aid in controlling the operation of the inlet and outlet valves, the link 22 being the return crank. The block 20 may be slid in the slot 19 as by a bell crank lever 23 pivoted at 24 upon the frame of the engine and having a link 25 connected to one arm thereof and pivoted to an arm 26 in turn pivoted to the block 20. This movement of the block 20 in the slot 19 is used for reversing the engine. The position of the parts shown in Fig. 1 will produce clockwise rotation of the crank pin 7. This may be a reverse motion with some types of engine and a forward motion with others.

The operation of the valves is controlled from the movement of the piston and also from the movement of the return crank, and, according to my invention, I combine these two movements into one in such a way as to cause a rectilinear movement of the valves to and from their seats. The movement from the piston is obtained through a link 27 pivoted at one end to the cross-head 4 and at the other end to an arm 28 fast upon a cam shaft 29 to which are secured cams 30 and 31. The movement from the return crank is caused by rocking of the link 18 and consequent movement of the block 20 which is transmitted to the cam shaft 32 by means of the link 33 forming an extension of the arm 26 and pivoted at the other end to an arm 34 secured on the cam shaft 32, which cam shaft carries the cams 35 and 36.

The stem 11 of the valve 10 is pivotally secured at 37 to a cam follower 38 in the form of a rocker carrying at its opposite ends rollers 39 and 40 which ride upon the cams 30 and 35, respectively. Similarly, the outlet valve stem 15 is pivotally connected at 41 to a cam follower 42 provided with rollers 43 and 44 bearing upon the surfaces of the cams 31 and 36, respectively.

From the above arrangement, it will be seen that upon operation of the engine, movement of the cross-head 4 and the return crank 22, one of which has a reciprocating motion and the other a continuous rotary motion, will be combined in the movement of the valve stems 11 and 15' and, consequently, of the valves secured thereto. Movement of the cross-head 4 causes rocking or reciprocating of the cam shaft 29, and movement of the return crank 22 causes rocking of the link 18 and consequent rocking or reciprocating of the cam shaft 32.

The operation of one of the valves 10 may be still better understood from an inspection of Figs. 3, 4, 5, and 6. These figures show the operation of the inlet valve at the head end of the cylinder, and it is to be understood that a similar operation of the inlet valve at the other or crank end takes place and that the operation of the two outlet valves which are normally used will likewise take place in proper timed relation to the operations of the inlet valves.

Figure 3:
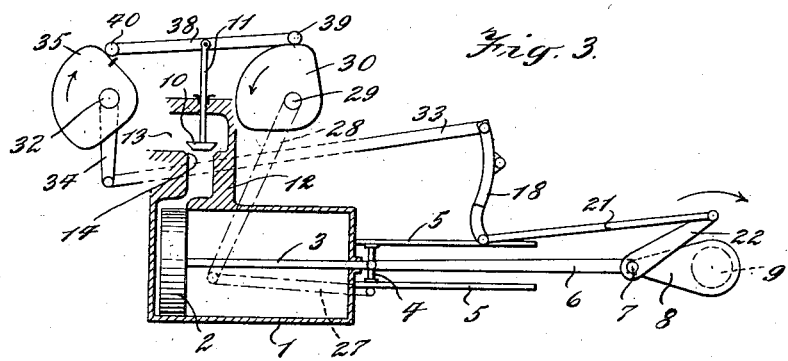
Figure 4:
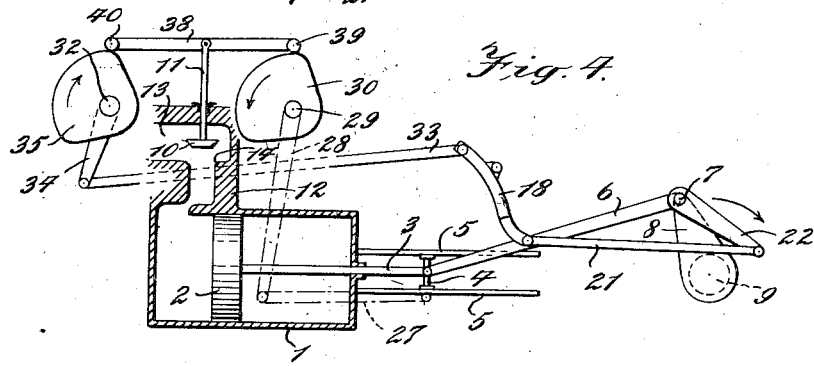

Fig. 3 shows the arrangement of parts at the beginning of the stroke where the piston is at one end of the cylinder, and the inlet valve is open slightly for the admission of steam. The directions in which the various parts move are indicated by the arrows. As steam enters the cylinder, the piston is forced towards the right to some such position as shown in Fig. 4. Movement of the cross-head 4 will cause rocking of the shaft 29, whereas movement of the return crank 22 causes rocking of the shaft 32, it being noted that in these diagrammatic Figs. 3, 4, 5, and 6 the positions of these shafts are reversed with respect to that which they occupy in Fig. 1. This is done for convenience in illustration and to avoid overlapping parts, particularly in Fig. 1.

Figure 5:
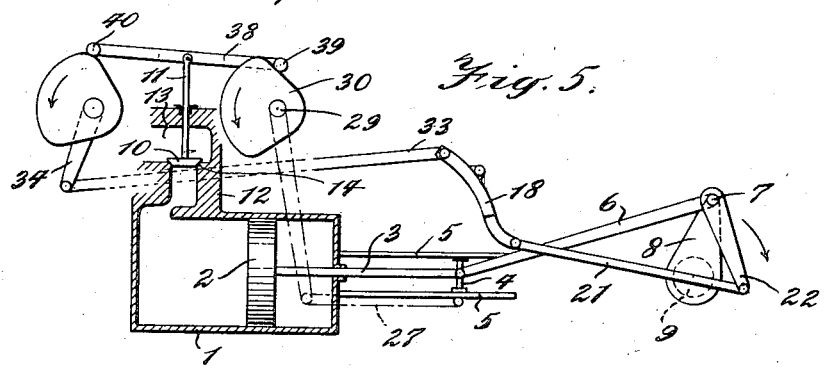
Figure 6:
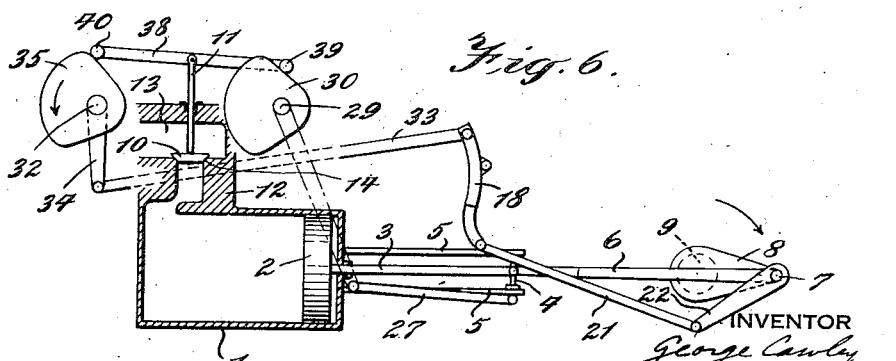

Fig. 5 shows the approximate relation of the parts at cut-off position, at which position the inlet valve is closed so that the remaining movement of the piston may take place under the influence of the expansion of steam. This expansion continues until the parts reach some such position as indicated in Fig. 6, which figure indicates the relation of the parts at the end of the stroke. The inlet valve, of course, remains closed during the return stroke, and during this time the outlet valve is opened by means of cams 31 and 36, corresponding to the like-numbered cams of Fig. 1.

Reversal through movement of the block 20 to the other end of the slot 19 will not affect the relation of the cam 30 to the roller 39, and it will be seen that the cam 30 will always act to control the closing of the valve 10, whereas the cam 35 will always act to control the opening of that valve.

The block 20 may be moved to the other end of the slot 19 of the link 18 to place the valves in correct position for opposite operation of the engine. The position of the cam 30 with respect to the cam 35 may be accurately adjusted to get the desired action of the valve 10, particularly for varying the cut-off, and in Fig. 1 I have indicated one means by which this may be accomplished. This means comprises a hub 45 secured to the cam 30 and mounted upon a spiral tongue 46 secured on the cam shaft 29. The hub may be slid on the shaft by means of a fork 47 pivoted at 48 upon the frame of the engine and having a handle 49 for operation thereof.

While the lever 23 and fork 47 have been shown as being provided with short handles for operation, it is of course to be understood that where the invention is used on a locomotive, for instance, these handles will be replaced by suitable connections extending to some position handy for the operator.

Usually, the movement of the piston or cross-head and the movement of the crank are in phase with each other, whereas the piston and the return crank are out of phase with each other. For example, the cross-head will move in phase with the piston, whereas the return crank 22 is 90° or 270° out of phase with the piston. With my invention, however, the two motions may be brought accurately into cooperation with each other and merged to form the one rectilinear movement of the valve stems.

Figure 2:
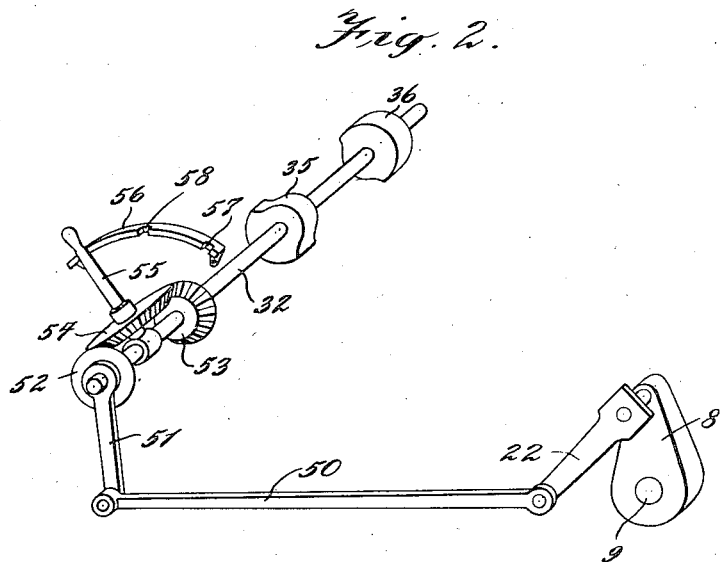
Fig. 2 is a perspective view of part of the apparatus appearing in Fig. 1, but showing a different form of control therefor.

In Fig. 2 is shown a device which may be used to take the place of the link 18. In this embodiment, the link or return crank 22 is connected to a link 50 pivoted to an arm 51 which is secured to a bevel gear 52 loosely mounted upon the cam shaft 32. Secured to this cam shaft is a second bevel gear 53, and meshing with the gears 52 and 53 is a third gear 54 pivotally mounted upon the shaft 32 and held in adjusted position thereon by means of an arm 55 which may engage in any one of several notches in a quadrant 56. It will be seen that by rotating the arm 55 and its associated gear 54, the relation between the shaft 32 and the arm 51, and consequently the return crank 22, can be varied. For example, in the position shown in Fig. 2, the cams 35 and 36 on the shaft 32 may be in correct position for clockwise movement, whereas when the arm 55 is moved into the notch 57, the cam may be in position for counterclockwise movement, and when the arm occupies the notch 58 the cams may be in position to operate the valves in proper sequence for idling or coasting speed.

From the above it will be seen that I have devised a valve operating mechanism which is simple in character, but which nevertheless is very flexible. By proper designing of the cams with respect to each other, any desired operation of the valves may be obtained and at the same time the various parts may be easily adjusted with respect to each other to get any desired cut-off as for idling or coasting speed.

While I have shown the invention as embodied in specific forms, it is to be understood that various changes in details may be made without departing from the scope of the invention, as defined by the appended claims.

I claim:

1. In combination, an engine having a piston movable in a cylinder, a return crank operated by said piston, a poppet valve movable to and from its seat and controlling the passage of fluid as required for the operation of said piston, said valve being operated by two cams having spaced axes and a cam follower engaging both of said cams and pivotally connected to said valve, means to rock one of said cams by the normal motion of said piston, means to rock the other of said cams by the normal motion of said crank, and means to change the relation of one of said cams to its follower to thereby change the relation of said valve to its seat at a given time, to cause reversal of the engine.

2. In combination, an engine having a piston movable in a cylinder, a return crank operated by said piston, a poppet valve movable to and from its seat and controlling the passage of fluid as required for the operation of said piston, said valve being operated by two cams having spaced axes and a cam follower engaging both of said cams and pivotally connected to said valve, means to rock one of said cams by the normal motion of said piston, means to rock the other of said cams by the normal motion of said crank, and means to change the relation of one of said cams to its follower to thereby change the relation of said valve to its seat at a given time, to cause reversal of the engine, said crank and piston operating 90° or 270° out of phase with each other, but the rocking means operated thereby causing said valve to operate in proper timed relation to the operation of said piston.

3. In combination, an engine having a piston movable in a cylinder, a return crank operated by said piston, a plurality of poppet valves each movable to and from its seat and controlling the passage of fluid as required for the operation of said piston, each of said valves being operated by two cams having spaced axes and a cam follower engaging both of said cams and pivotally connected to its valve, means to rock one of said cams by the normal motion of said piston, means to rock the other of said cams by the normal motion of said crank, means to adjust one of a pair of cams operating one valve with respect to the other cam of the pair, and means to change the relation of another one of said cams operating another valve with respect to its follower to thereby change the relation of said valve to its seat at a given time to cause reversal of the engine.

4. In combination, an engine having a piston movable in a cylinder, a return crank operated by said piston, a poppet valve movable to and from its seat and controlling the passage of fluid as required for the operation of said piston, said valve being operated by two cams having spaced axes and a cam follower engaging both of said cams and pivotally connected to said valve, means to rock one of said cams by the normal motion of said piston, means to rock the other of said cams by the normal motion of said crank, and means to change the relation of one of said cams to its follower to thereby change the relation of said valve to its seat at a given time, to cause reversal of the engine, said reversing means forming part of the means to rock one cam by the normal motion of the crank.

5. In combination, an engine having a piston movable in a cylinder, a return crank operated by said piston, a plurality of poppet valves each movable to and from its seat and controlling the passage of fluid as required for the operation of said piston, each of said valves being operated by two cams having spaced axes and a cam follower engaging both of said cams and pivotally connected to its valve, means to rock one of said cams by the normal motion of said piston, means to rock the other of said cams by the normal motion of said crank, means to adjust one of a pair of cams operating one valve with respect to the other cam of the pair, and means to change the relation of another one of said cams operating another valve with respect to its follower to thereby change the relation of said valve to its seat at a given time, to cause reversal of the engine, said reversing means forming part of the means to rock one cam by the normal motion of the crank.

6. In combination, an engine having a piston movable in a cylinder, a plurality of poppet valves controlling the passage of fluid as required for the operation of said piston, two parts operated by said piston and out of phase with each other, a plurality of pairs of cams, one pair for each of said valves, one cam in each pair being reciprocated by one of said parts and the other cam in the pair being reciprocated by the other of said parts, means operated by the combined action of the cams in one pair to open and close one valve only to the exclusion of the other valves, and means to vary the relation of one cam in one pair to the part operating it without changing the relation of the cams in the other pairs to the parts operating them, thus varying the time of operation of the valve operated by said pair of cams.

7. In combination, an engine having a piston movable in a cylinder, a plurality of poppet valves controlling the passage of fluid as required for the operation of said piston, two parts operated by said piston and out of phase with each other, a plurality of pairs of cams, one pair for each of said valves, one cam in each pair being reciprocated by one of said parts and the other cam in the pair being reciprocated by the other of said parts, means operated by the combined action of the cams in one pair to open and close one valve only to the exclusion of the other valves, means to vary the relation of one cam in one pair to the part operating it without changing the relation of the cams in the other pairs to the parts operating them, thus varying the time of operation of the valve operated by said pair of cams, and other means to simultaneously change the relation of a cam in each pair to the part operating said cams, to effect reversal of the engine.

8. In combination, an engine having a piston movable in a cylinder, a plurality of poppet valves controlling the passage of fluid as required for the operation of said piston, two parts operated by said piston and out of phase with each other, a plurality of pairs of cams, one pair for each of said valves, one cam in each pair being reciprocated by one of said parts and the other cam in the pair being reciprocated by the other of said parts, means operated by the combined action of the cams in one pair to open and close one valve only to the exclusion of the other valves, means to vary the relation of one cam in one pair to the part operating it without changing the relation of the cams in the other pairs to the parts operating them, thus varying the time of operation of the valve operated by said pair of cams, and other means to simultaneously change the relation of a cam in each pair to the part operating said cams, to effect reversal of the engine, one of said cams in each pair acting to open its valve and the other cam in the same pair acting to close its valve, regardless of direction of operation.

GEORGE CAWLEY.